April 28, 1931.  K. M. E. ZWINKEL  1,802,861
MECHANICAL ROCKET POWER FOR AIRPLANES
Filed Oct. 5, 1929   4 Sheets-Sheet 1

April 28, 1931. K. M. E. ZWINKEL 1,802,861
MECHANICAL ROCKET POWER FOR AIRPLANES
Filed Oct. 5, 1929 4 Sheets-Sheet 2

Inventor
KARL MAX ERICH ZWINKEL
Munson H. Lane
Attorney

April 28, 1931.  K. M. E. ZWINKEL  1,802,861
MECHANICAL ROCKET POWER FOR AIRPLANES
Filed Oct. 5, 1929  4 Sheets-Sheet 3

Inventor
KARL MAX ERICH ZWINKEL.
By Munson H. Lane.
Attorney

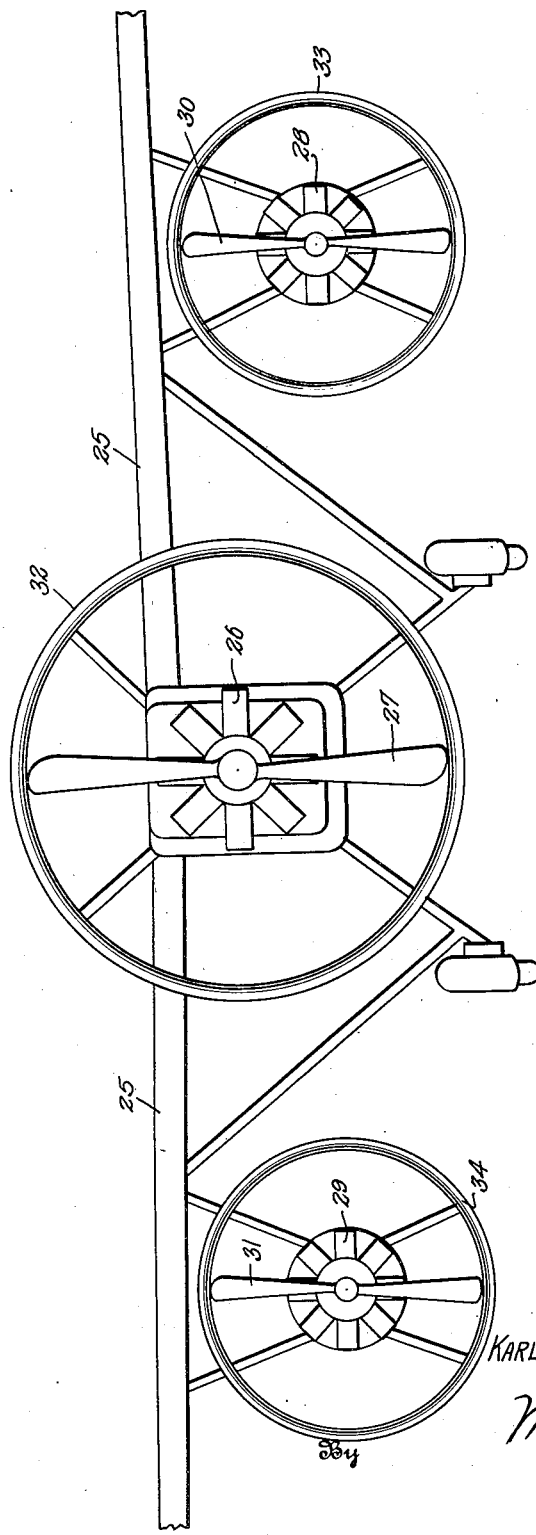

Patented Apr. 28, 1931

1,802,861

UNITED STATES PATENT OFFICE

KARL MAX ERICH ZWINKEL, OF DENVILLE, NEW JERSEY, ASSIGNOR TO THE TUBULAR AIR-CRAFT CORPORATION, OF SECAUCUS, NEW JERSEY

MECHANICAL ROCKET POWER FOR AIRPLANES

Application filed October 5, 1929. Serial No. 397,634.

The invention relates to an improvement in what I have termed a mechanical rocket power designed for the propulsion of airplanes. This application is a continuation in part of my application Serial No. 353,013, filed April 6, 1929.

One object of the invention is to increase the effective power of the motors employed for driving airplane propellers.

A further object is simplicity of construction and convenience of mounting and assembling the power units.

It is a matter of common knowledge that a one hundred horse-power airplane develops greater proportional lift and speed than a one thousand horse-power airplane. Thus, assuming that a one hundred horse-power plane will carry four persons, a one thousand horse-power plane will not carry forty persons, nor even half that number.

Again, assuming that an airplane equipped with a single propeller driven by a one hundred horse-power motor is capable of developing a lift of one thousand pounds and a speed of one hundred miles per hour, it does not follow that if an additional hundred horse-power motor and propeller are attached to the ship, double the amount of lift and speed will be developed. The loss in power is due in part to increased air resistance of the second motor. If, however, the second motor is placed directly to the rear of the first, the increase in air resistance is less, but there is this disadvantage, namely, that the second motor operates merely in the wash, i. e., thinned out, used air, air of uneven quality and resistance, from the first motor's propeller.

Accordingly, it is desirable that all the motors and propellers should work in a longitudinal alignment, and that any decrease in efficiency due to each operating in the wash of the one ahead of it should be compensated by furnishing each one with additional fresh air. The result is decrease in drag or resistance and an increase in lift and propulsive force.

It is also desirable that any motor with its propeller should carry its own weight, and thus relieve the wings of this burden.

According to the present invention, each motor and propeller is surrounded by a ring element having a stream line profile, preferably corresponding to the Gottingen wing profile. This element may be termed a rocket power ring, and as proved by actual tests, the use of such a ring increases the efficiency of the motors nearly thirty per cent and relieves the wings or planes of the entire weight of the combined ring, motor, propeller, and fuel tank.

The power applied by means of these ring units can be used to increase either speed or lift, without change in the apparatus. An airplane equipped with such units possesses automatic stability, imparted by the use of the rocket power units. Almost perfect stream line action is attained, and accordingly both suction and push are available. Through the use of the rocket power unit, a higher ceiling is obtainable; in other words, a plane equipped with my rocket power units is enabled to go through thinner air.

The power is preferably applied in the form of detachable units which may be simply constructed. A plane so equipped has reserve power in case of the failure of one or more of the motors, as the others will still function. The defective units can be readily removed and replaced with others, and this can be done in less than a half hour.

The power units are preferably applied on top of the fuselage, and a plane so equipped is particularly adapted for flying over water, as the motors are out of reach of the spray during landing.

The invention will be more readily understood by reference to the accompanying drawings, in which:

Fig. 5 is a front elevation showing a tri-motor plane equipped with the rocket power ring members.

Figure 1:
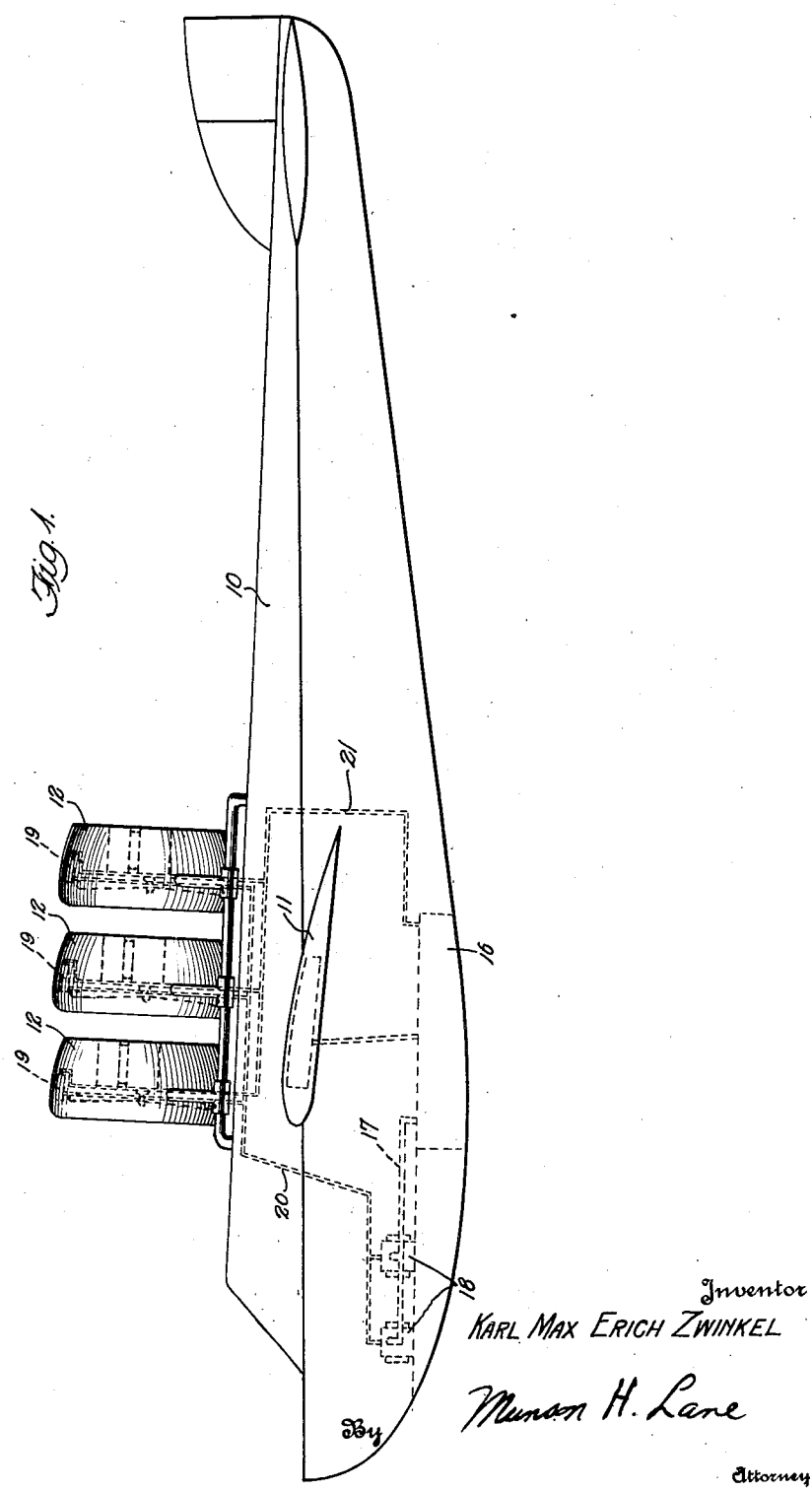
Fig. 1 is a side elevation, partly in section, showing an airplane equipped with the rocket power ring units.
Figure 2:
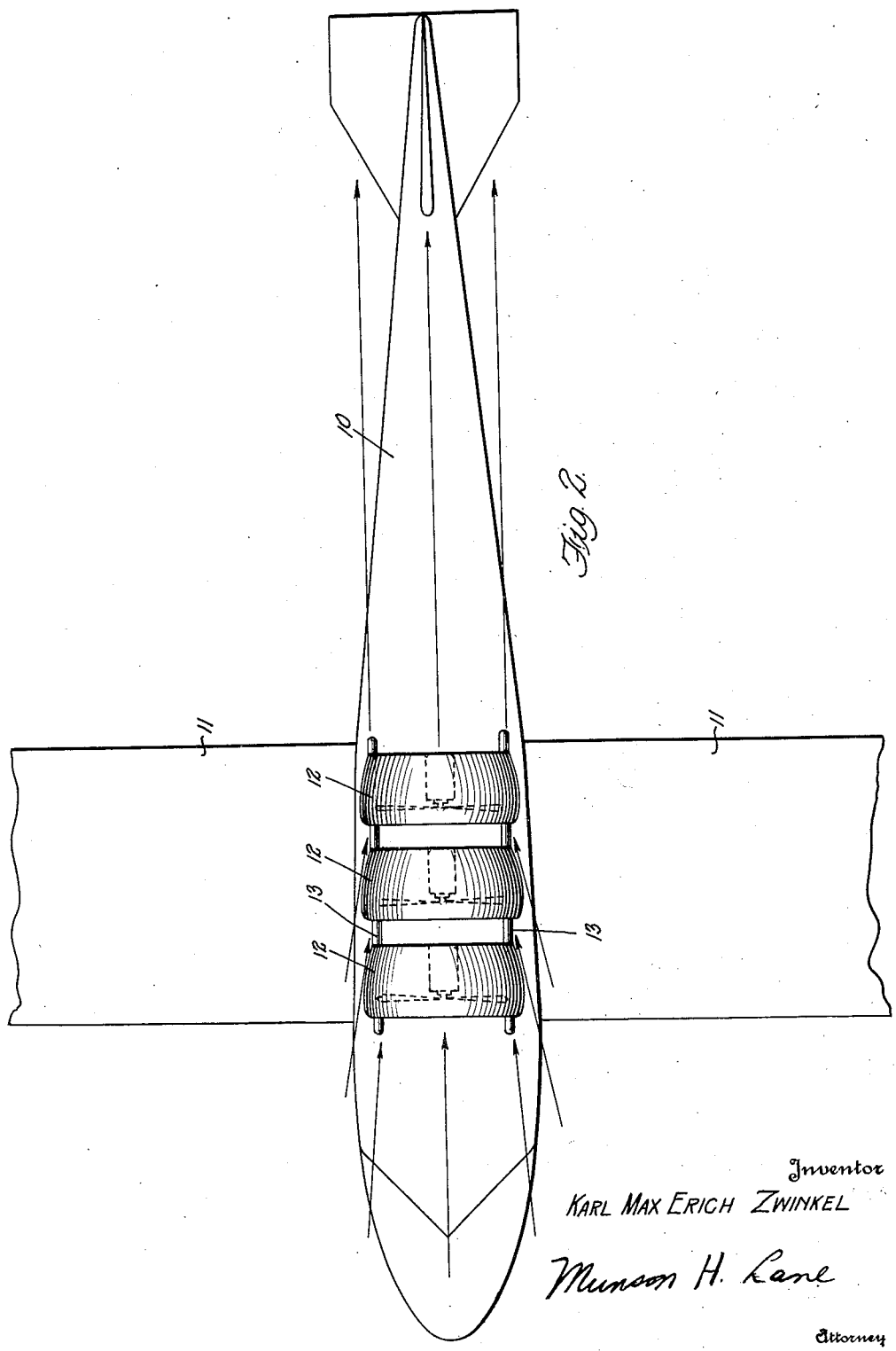
Fig. 2 is a plan view of the same.

Referring particularly to Figs. 1 and 2, the reference numeral 10 denotes the fuselage of an airplane of any suitable construction, and having wings or planes 11—11 extending laterally therefrom. At a suitable location, preferably on top of the fuselage, a plurality of ring members 12—12—12 are mounted. As shown, these members are three in number and have a common longitudinal axis.

Figures 3, 4:
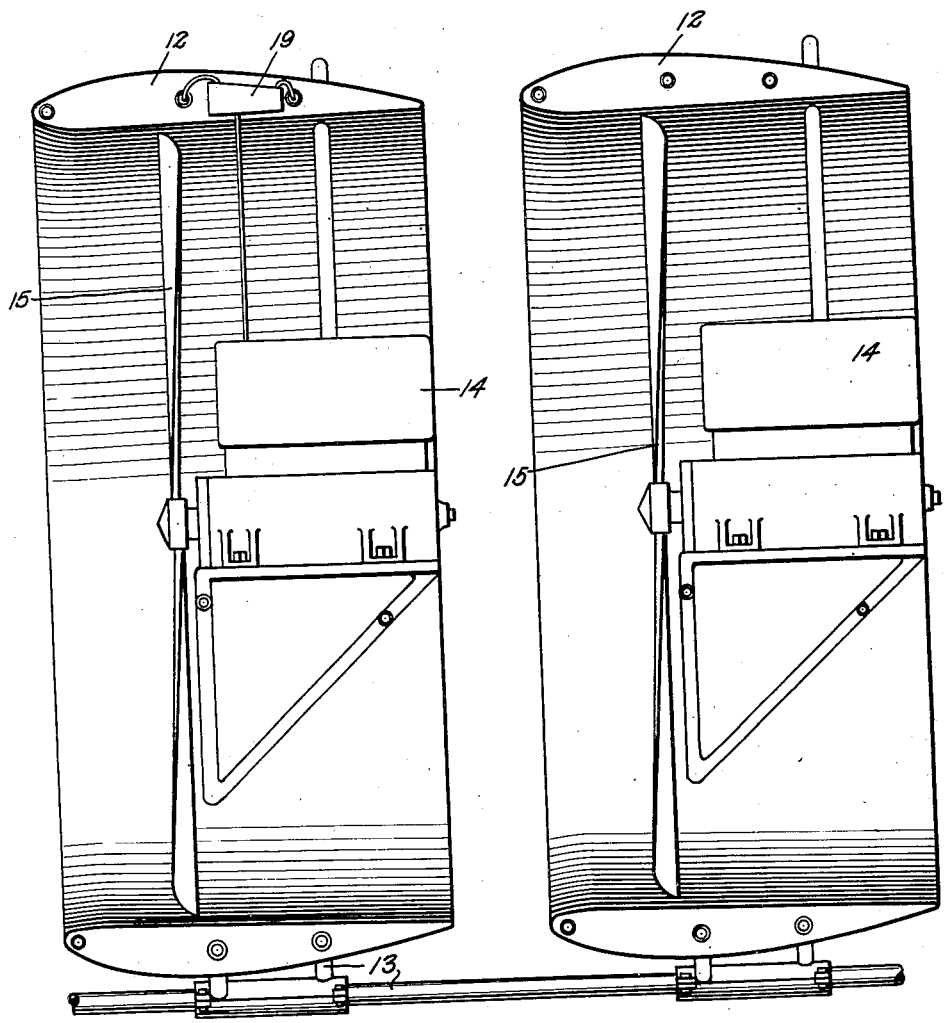
Fig. 3 is a detail view partly in section and partly in elevation, showing the mounting of two of the power units.
Fig. 4 is a detail sectional view showing the profile of one of the ring members.

The details of construction and the mounting of the rings will be more apparent by reference to Figs. 3 and 4. The ring members are detachably secured in any suitable manner, to frame members 13 extending longitudinally of the body of the plane. Any one of the units may be readily removed without detaching the other units. Within each ring member 12 is detachably mounted a suitable motor 14, which drives a propeller 15.

A desirable fuel supply system is illustrated in Figs. 1, 3 and 4, a main fuel tank being shown at 16 in Fig. 1, from which a pipe 17 leads to pumps 18, 18, which force fuel through pipe 20 to individual fuel tanks 19 located within the rings 12, such fuel tanks 19 being located directly above the motors 14, so that the fuel flows by gravity to the motors. Overflow pipes from each of the fuel tanks 19 lead to a return pipe 21, which empties into the main tank 16.

It has been found that certain relations should be maintained between the diameter of each ring unit and the chord length or depth of the unit. For best results the chord length is approximately one-half the diameter. The chord length should not exceed this amount, though it may be decreased somewhat without seriously impairing the efficiency of the device.

Likewise certain relations should exist between the space between rings and the chord length or depth of each individual ring. This spacing varies with the speed of the motor, and the pitch of the propeller, and should be decreased as the motor speed or propeller pitch is increased. The space between rings should not, however, exceed one-half the chord length of the rings, nor be less than one-third the chord length, regardless of the pitch of the propeller, or the speed of the motor. It is also desirable that each successive propeller from front to rear produce progressively increasing air compression, and for this purpose the speed of the motors, or pitch of the propellers, or both, may be progressively increased from front to rear, and consequently the spacing between rings will be decreased from front to rear, from a maximum of one-half chord length to a minimum of one-third chord length.

It is also important that each propeller be located at the center of pressure of its respective ring element. A marked decrease in efficiency results from a material departure from this location. This center of pressure varies with each different profile used, and may be determined by test in a wind tunnel.

The number of rings employed may be varied. A lifting effect is obtained with a single ring. Two rings are found to produce very unsatisfactory results, and should not be used. Three or more rings are preferable to a single ring, as greater efficiency is obtained in this manner. For many purposes, I have found that three rings produce the best results.

The rings may be employed with beneficial results on planes of existing types, and may be applied to the propellers, for example of a tri-motor plane 25, as illustrated in Fig. 5. As shown, the plane is provided with a principal motor 26, which drives a main propeller 27, and with two auxiliary side motors 28, 29 driving propellers 30, 31 respectively. A large ring 32 may be applied at the main motor 26 and propeller 27, and smaller rings 33, 34 employed at the sides.

The invention has been described in detail for the purpose of illustration, but it will be understood that it is not to be limited in scope to such details, and that many modifications may be resorted to without departing from the spirit of the invention.

What I claim is:—

1. A propulsive unit for airplanes including three or more ring members of stream line profile, having a common longitudinal axis, the individual rings being spaced apart a distance of from one-third to one-half the chord length of the rings, and a plurality of propellers, one mounted within each ring.

2. A propulsive unit for airplanes including three or more ring members of stream line profile, having a common longitudinal axis, the diameters of the individual ring members being at least double the depth of the ring members, and the distance between ring members being from one-third to one-half of the chord length.

3. A propulsive unit for airplanes, including three or more ring members of stream line profile, having a common longitudinal axis, and spaced apart a distance of from one-third to one-half the chord length of the individual ring members, and propellers mounted within the ring members, the distance between ring members being made greater with a lessening of the pitch of the propeller, and less with a greater pitch of the propeller.

4. A propulsive unit for airplanes comprising a plurality of ring members of stream line profile, having a common longitudinal axis, propellers mounted within the ring members, and motors for driving said propellers, the individual ring members being spaced apart a distance varying between one-third and one-half of their chord length, being greater with a low speed of motor, and less with a high speed of motor.

5. A propulsive unit for airplanes comprising a plurality of ring members of stream line profile, having a common longitudinal axis, propellers mounted within the ring members, and motors for driving said propellers, the individual ring members being spaced apart a distance varying between one-third and one-half of their chord length, being greater with a low speed of motor, and less with a high speed of motor, the spacing of the ring members being also dependent on the pitch of the propellers, being greater with a lessening pitch, and less with a higher pitch.

6. A mechanical rocket power for airplanes, comprising a plurality of ring members spaced apart and arranged along a longitudinal axis, a plurality of propellers, one mounted in each ring member, and means for operating said propellers at progressively increasing speeds from the intake end to the discharge end.

7. An airplane having a rocket power propulsive device located on top of the fuselage and extending longitudinally thereof, said propulsive device comprising a plurality of ring members of stream line profile, spaced apart, having a common longitudinal axis, and means for producing progressively increasing compression within said units from the intake end to the discharge end.

8. A mechanical rocket power for propelling airplanes, comprising a plurality of similar replaceable rocket power units arranged end to end, each unit comprising a ring member of stream line profile, the consecutive members discharging one into the other, and means for producing successively increasing compressions within the successive units.

9. In an airplane, a propulsive device mounted on top of the fuselage, open at each end and at intermediate intervals along its length, comprising a plurality of ring members of stream line profile, arranged along a longitudinal axis, and spaced apart to permit entrance of air between the ring members, and propellers mounted one within each of said ring members, and adapted to draw air from the end and intermediate intakes of said propulsive device, and to force air rearwardly through the discharge end.

10. In an airplane, a longitudinal tube centrally mounted on top of the fuselage, open at each end and at intermediate intervals along its length, and propellers mounted at intervals along said tube adapted to draw air from said intermediate intakes, and to force the air rearwardly through the discharge end, said tube comprising a plurality of longitudinally disposed, spaced ring members within which the propellers are mounted.

11. In an airplane, a propulsion device comprising a plurality of like replaceable and independent rocket power units arranged end to end, each unit comprising a ring member of stream line profile, each ring member having a motor and a propeller detachably mounted therein.

12. In an airplane, a propulsion device comprising a plurality of like replaceable and independent rocket power units arranged end to end, each unit comprising a ring member having a motor and propeller mounted therein, and fuel tanks mounted in said ring members for supplying fuel to said motors.

13. In an airplane, a propulsion device comprising a plurality of like replaceable and independent rocket power units arranged end to end, each unit comprising a ring member of stream line profile, each ring member having a motor and a propeller detachably mounted therein, and means for supplying fuel to the motors comprising a main fuel supply, individual fuel tanks located one within each ring unit, and communicating with the main fuel supply and said motors, and a pump for circulating fuel through the system.

In testimony whereof I affix my signature.

KARL MAX ERICH ZWINKEL.